A. F. GILLET.
NON-SKID APPENDAGE FOR VEHICLE WHEELS.
APPLICATION FILED SEPT. 27, 1919.
1,371,237.
Patented Mar. 15, 1921.
2 SHEETS—SHEET 1.
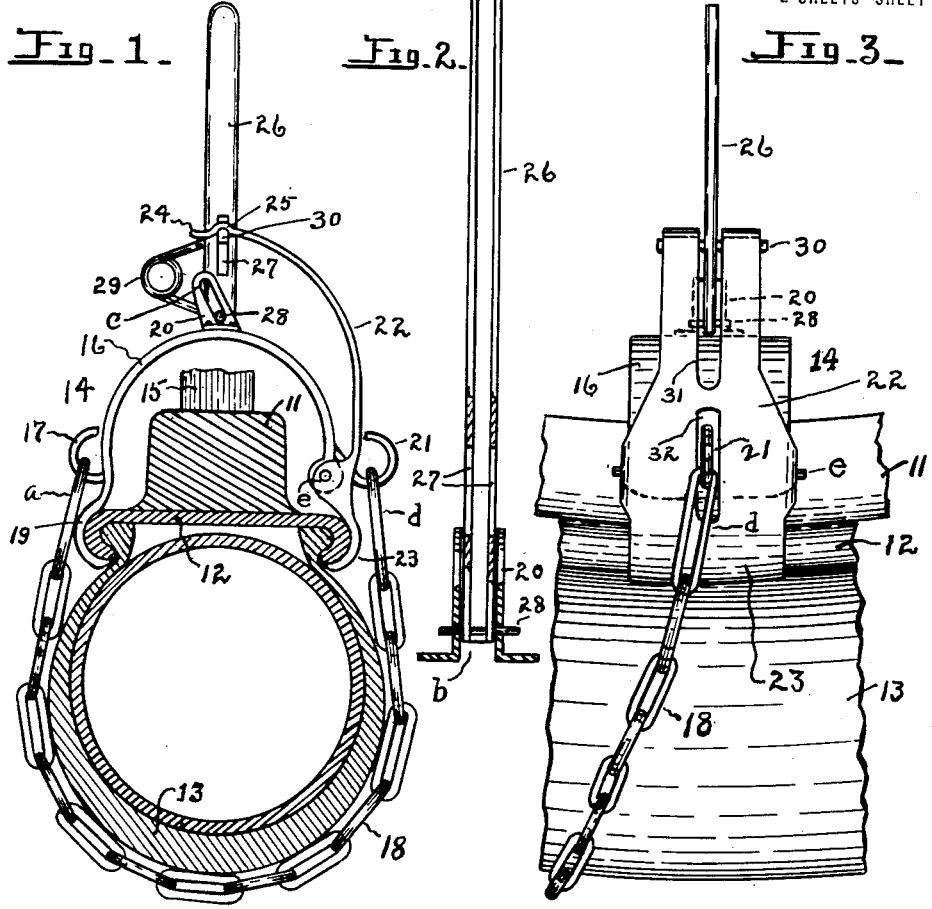
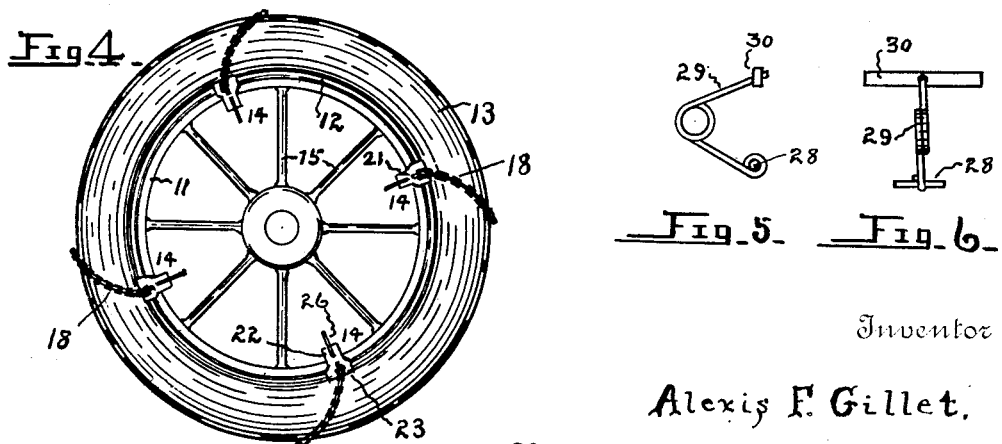
Inventor
Alexis F. Gillet.
By Hiram A. Sturges
Attorney A. F. GILLET.
NON-SKID APPENDAGE FOR VEHICLE WHEELS.
APPLICATION FILED SEPT. 27, 1919.
1,371,237.
Patented Mar. 15, 1921.
2 SHEETS—SHEET 2.
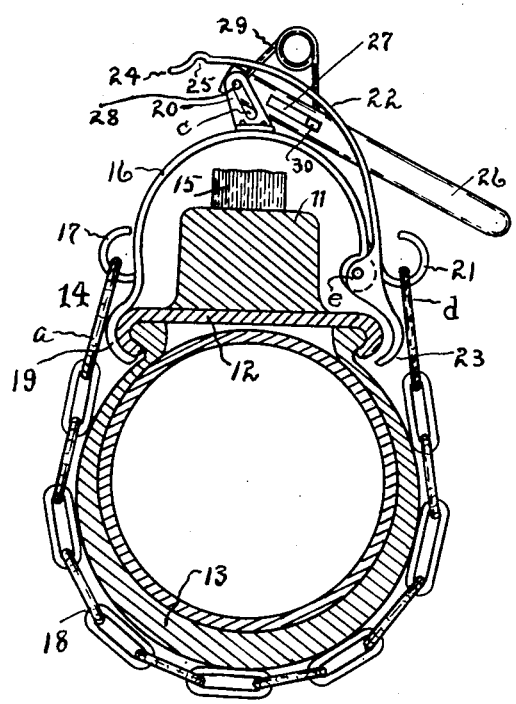
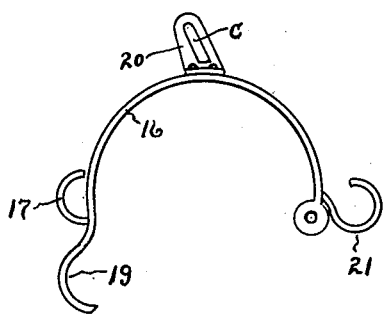
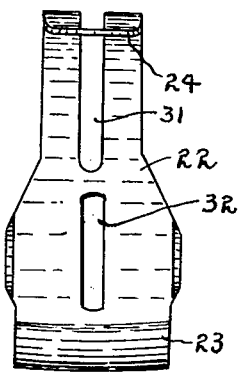
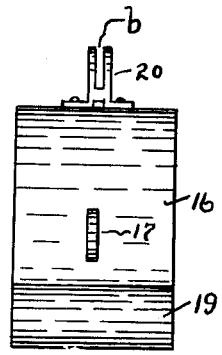
Inventor
Alexis F. Gillet,
By Hiram A. Sturges,
Attorney

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA, A CORPORATION.

NON-SKID APPENDAGE FOR VEHICLE-WHEELS.

1,371,237.  Specification of Letters Patent.  Patented Mar. 15, 1921.

Application filed September 27, 1919. Serial No. 326,910.

*To all whom it may concern:*

Be it known that I, ALEXIS F. GILLET, a citizen of the United States, residing at Omaha, in the county of Douglas and State of Nebraska, have invented certain new and useful Improvements in Non-Skid Appendages for Vehicle-Wheels, of which the following is a specification.

This invention relates to non-skid appendages for vehicle tires, for use more particularly in connection with the tires of motor vehicles, and has for its object to provide a plurality of chain-loops which may lie loosely to partly surround the tire, each being provided with a clamping device of such construction that it may be conveniently applied to the tire or removed therefrom.

The invention consists of the novel construction, combination and arrangement of parts as described herein and claimed, and as illustrated in the accompanying drawing, wherein—

Figure 1 is a view of a vehicle tire and felly in cross-section with a non-skid appendage mounted thereon. Fig. 2 is a view of a hand-lever, partly in section. Fig. 3 is a broken away side view illustrating the parts shown in Fig. 1. Fig. 4 is a side view of a vehicle wheel with the non-skid appendages mounted thereon. Fig. 5 shows a side view of a latch-spring and an end view of a latch-bar. Fig. 6 is a view of the spring and latch-bar taken at right angles to the view shown in Fig. 6.

Fig. 7 is a view similar to that shown in Fig. 1, the clamp being released from the wheel-rim. Fig. 8 is a side view of a clamping-plate. Fig. 9 is a view of the inner side of a resilient locking-plate. Fig. 10 is a side view of the clamping-plate.

The invention is illustrated in connection with the felly 11 and rim 12 of a vehicle wheel, the tire or casing 13 generally being constructed of rubber.

To prevent skidding I provide a plurality of appendages 14 adapted to be disposed between the spokes 15 of the vehicle wheel, each consisting, in part, of a clamping-plate 16 approximately of U-shape in cross-section, said plate having a hook 17 to which is non-removably secured a terminal link *a* of a chain 18, said plate being provided at one of its ends with a curved jaw or contact-piece 19 adapted to engage one of the sides of the rim 12, and being provided intermediate its ends with an upstanding bracket 20 having a channel *b* (Fig. 10.) between its sides and having its sides provided with slots *c* (Fig. 8). Numeral 21 indicates a hook which is provided for the clamping-plate near the end thereof opposite to the hook 17 for receiving the terminal link *d* of the chain, and upon occasion, to permit a release of said link.

At 22 is indicated a locking-plate which, as indicated at *e*, is pivotally mounted, between its ends, upon an end of the clamping-plate, said locking-plate having, at one of its terminals, a curved jaw or contact-piece 23 adapted to engage the side of the rim 12, its opposite terminal being provided with a thumb-piece 24, and having a groove 25 formed transversely therein, adjacent to the thumb-piece.

At 26 is indicated a hand-lever, preferably of U-shape in cross-section, said lever, between its ends, having its sides provided with slots 27, its inner end being mounted upon a pivot pin 28 which engages in the slots *c* of the bracket 20, and which is engaged by a spring 29, said spring being provided with a latch-bar 30 which also engages in the slots 27.

The locking-plate 22 is provided with a slot 31 for receiving the hand-lever, and also is provided with a slot 32 for receiving the hook 21.

While in Fig. 4 I have shown only four of these non-skid devices mounted upon the vehicle tire, any required number may be used, depending upon the diameter of the wheels, the weight of the load and whether the vehicle is to be driven upon ice or upon muddy roads, the length of the chains being such that they will lie loosely upon the tire, this feature being of importance since it prevents the chains from becoming unduly worn, and permits removal of the chains from the tire and also permits the chains to be readily applied to a tire.

It will be seen that operativeness depends upon the contact of the hook-plates 19 and 23 upon the opposed sides of the rim 12, and since the latch-bar 30 will be maintained in engagement with the groove 25 of the locking-plate 22 by operation of the spring 29, the hook-plate 23 will normally remain in engagement with a side of the rim 12 until the latch-bar is removed from said groove, the removal of said latch-bar being effected by use of the hand-lever, and assisted by manual use of the thumb-piece 24 for pressing the plate 22 outwardly from said bar 30, said plate 22 preferably being constructed of resilient material.

On account of the proportion of parts and the pivotal mounting e for the locking-bar upon the clamping-bar, the curved contact-plate 23, by use of the hand-lever may be moved outwardly to the position shown in Fig. 7, to be released from the rim 12, the hook 21 thereby being disposed at such a distance from the locking plate 22 that the link d may be removed from said hook 21, and this is the operation when it is desired to remove the device from the tire, the lever 26 having a swinging movement so that a considerable part thereof will engage in the slot 31, and the pivot-pin 28 moving toward the outer end of the slots c of the bracket 20, and the latch-bar 30 also having a limited outward movement in the slot 27 of the hand-lever.

By referring to Fig. 1 it will be seen that when the the jaw 23 is in engagement with a side of the rim 12, the terminal of the hook 21 will be disposed closely adjacent to the plate 22, for preventing removal of the link d from said hook, the plate 22 being in engagement with the latch 30 and maintained in said engagement by operation of the spring 29, the lever 26 being disposed radially and projecting inwardly of the wheel so that it will not be obtrusive.

It will be appreciated by users of the device that the non-skid appendages as described may be conveniently and readily applied to or removed from the tires of vehicles. The fact that a plurality of short chains is provided for use at intervals of the tire is considered to be an advantage, since, if one of the chains becomes injured or worn, it may be replaced at a nominal expense. Also it is considered that the U-shaped form for the clamping-plate is an advantage since it will not engage and consequently will not cause abrasion or injury to the felly.

What I claim as new and desire to secure by Letters Patent is,—

In a non-skid device for a wheel tire provided with a rim, a plate having a curved jaw for engaging a side of the rim, a bracket provided with a slot and mounted on said plate, a second plate having a curved jaw and pivotally mounted on the first named plate, anti-slipping means connected with the first named plate for engaging the tire, a resilient member having a pivot-pin engaging in the slot of the bracket and provided with a latch-bar, and a hand-lever having a slot for receiving said latch-bar and adapted to have a swinging movement from the pivot-pin of said resilient member for moving the second plate to cause the curved jaw of the latter to engage a side of said rim.

In testimony whereof, I have affixed my signature in presence of two witnesses.

ALEXIS F. GILLET.

Witnesses:
 HIRAM A. STURGES,
 E. E. GRAVES.